Patented Apr. 28, 1925.

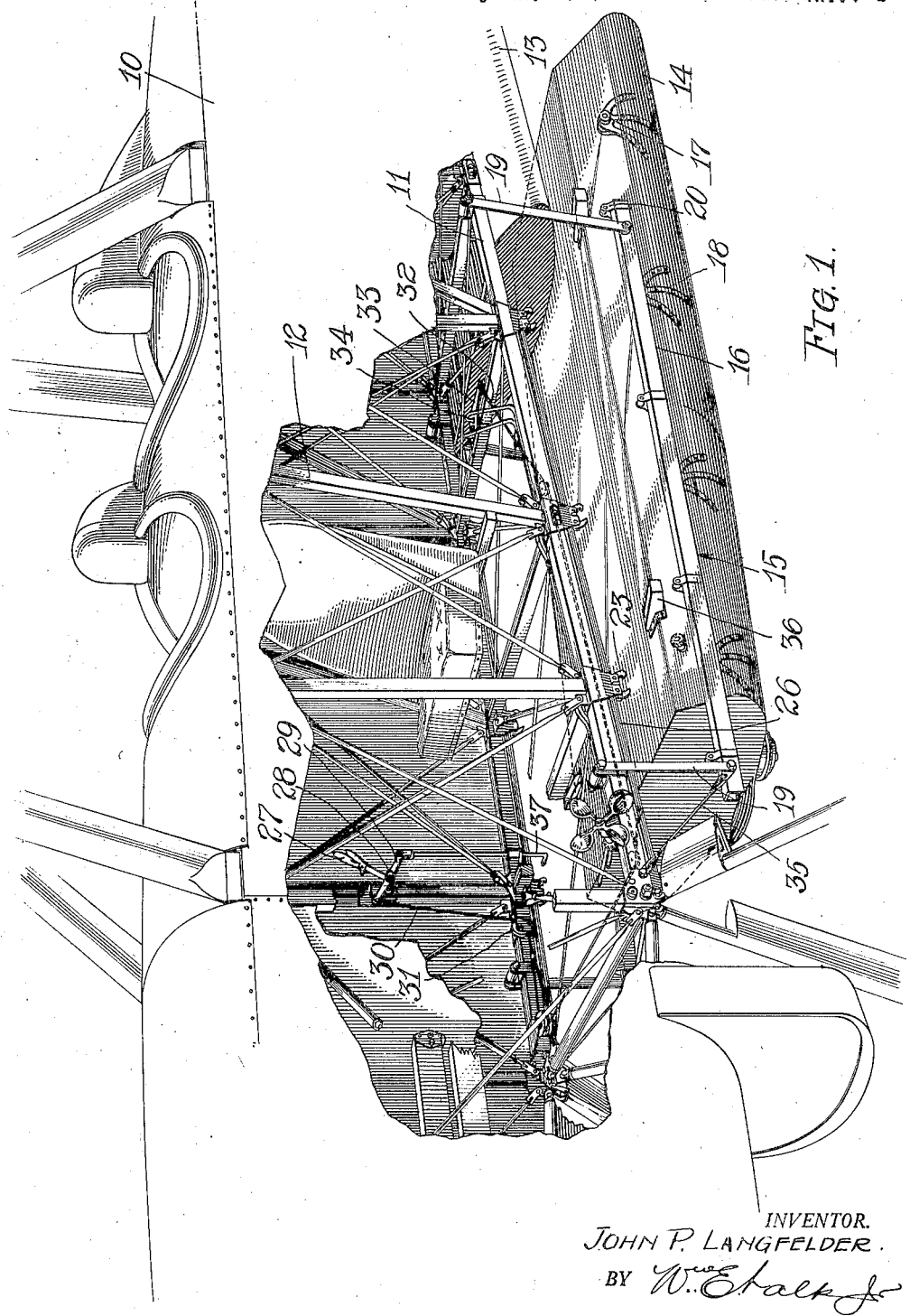

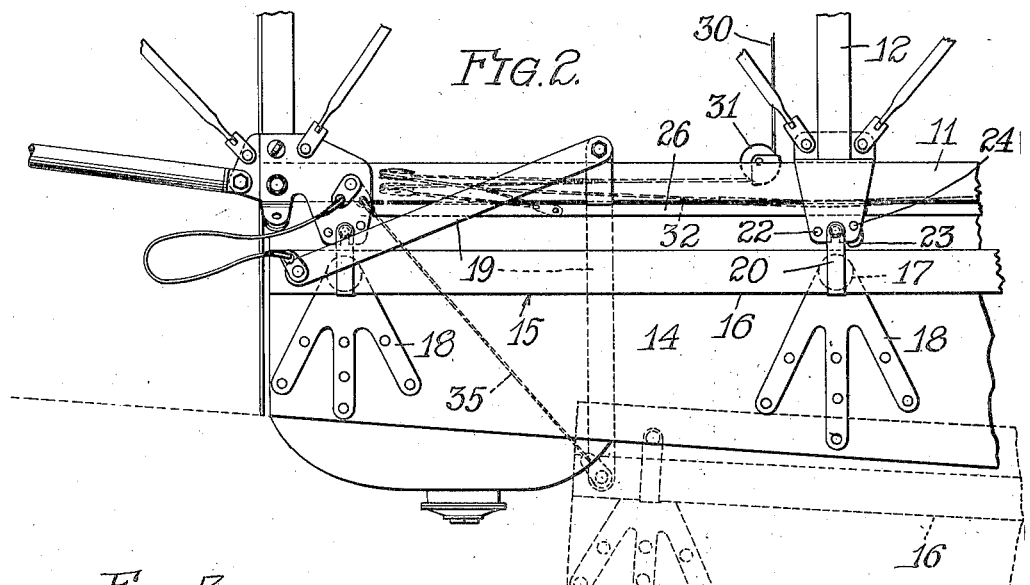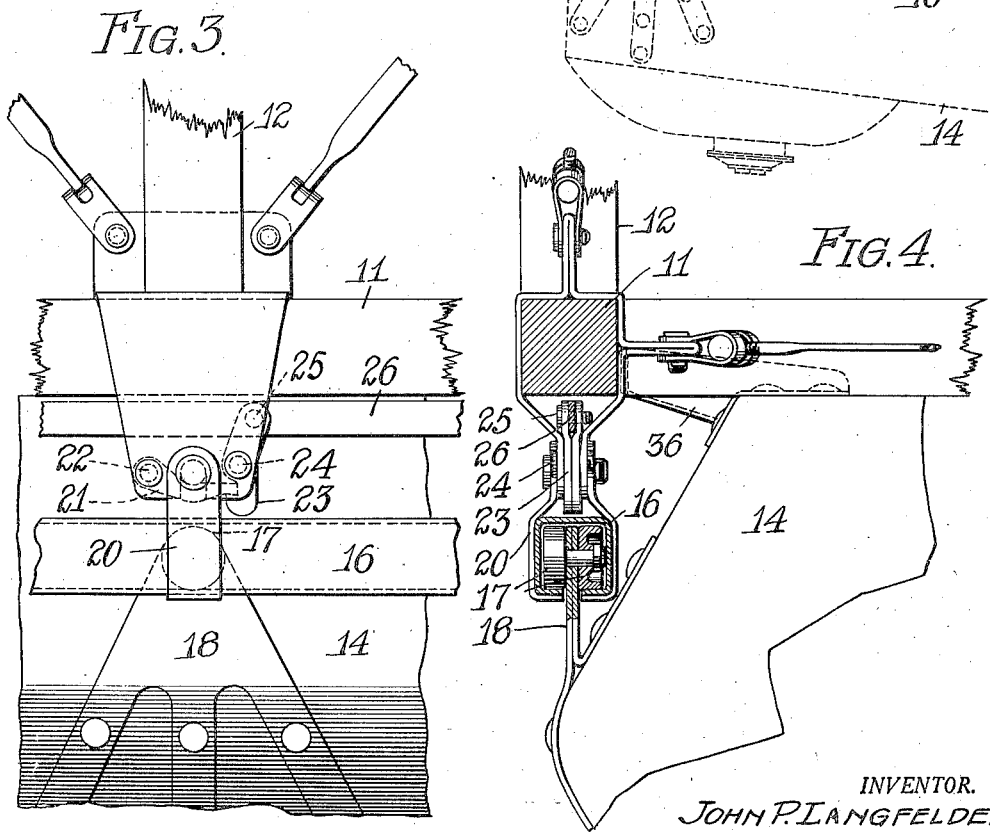

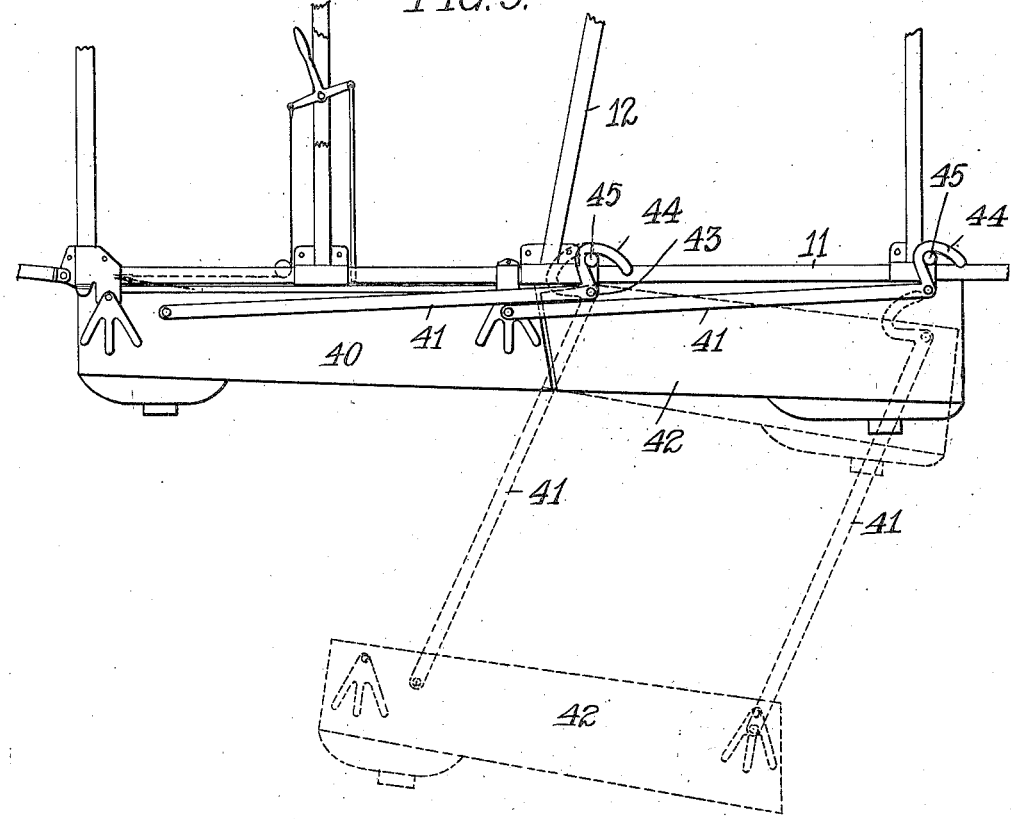

1,535,532

UNITED STATES PATENT OFFICE.

JOHN P. LANGFELDER, OF JAMAICA, NEW YORK, ASSIGNOR, BY MESNE ASSIGNMENTS, TO CURTISS AEROPLANE AND MOTOR COMPANY, INC., OF GARDEN CITY, NEW YORK, A CORPORATION OF NEW YORK.

AEROPLANE.

Application filed May 22, 1922. Serial No. 562,618.

*To all whom it may concern:*

Be it known that I, JOHN P. LANGFELDER, a citizen of the United States, residing at Jamaica, in the county of Queens and State of New York, have invented certain new and useful Improvements in Aeroplanes, of which the following is a specification.

My invention relates to aeroplanes.

An object of the invention is to so construct and combine the motive fuel tank and aeroplane fuselage or body that the former enters into and actually forms a composite part of the fuselage or body cover.

A further object of the invention is to construct and support the fuel tank in such manner that, in an emergency, it is capable of being quickly released and shed clear of the machine.

A still further object of the invention is to provide a fuel tank support, which, when retracted, holds the fuel tank firmly in place, and which, when extended, guides the fuel tank in its initial movement to prevent it from subsequently fouling some other part of the machine.

Other objects and advantages of the invention will be hereinafter explained.

In the drawings:—

Figure 1 is a perspective view of an aeroplane fuselage, partly broken away, showing the relation of the motive fuel tank and its support;

Figure 2 is a side elevation of the fuel tank and its support showing the relative position of the parts thereof; the full lines indicating the position of the tank and the support when the latter is retracted and the fuel tank held firmly in place, the dotted lines indicating the position of the support subsequent to its release;

Figure 3 is a fragmentary side elevation of a portion of the release mechanism;

Figure 4 is an enlarged transverse vertical sectional view better illustrating the relation of the fuel tank and its support;

Figure 5 is a side elevation of a modified form of gas tank release; and

Figures 6, 7, and 8 are detail views of such modifications.

In the embodiment of the invention selected for illustration, the aeroplane fuselage or body is designated in its entirety as 10. Said fuselage or body is preferably of the skeleton framework type and comprises longerons 11, fuselage struts 12, and suitable covering 13, the latter for a portion of its length on the under side of the skeleton framework being interrupted whereby space is provided for the fitting engagement therein of the motive fuel tank. The motive fuel tank, designated in its entirety as 14, is so shaped and constructed as to completely fill the space above referred to, that the continuity of the fuselage cover 13 is uninterrupted when said fuel tank is in place. In other words, when the fuel tank is in place it may be said to actually form a composite part of the fuselage or body cover. Thus positioned, obviously it is an easy matter to shed the fuel tank in an emergency.

The fuel tank, instead of being directly fastened to the skeleton framework of the body is held in place by a support 15 which is adapted to be extended and retracted according to whether or not it is desired that the fuel tank be released. Normally the support 15 occupies a position indicated by the full lines of Figure 2. Thus positioned, the fuel tank 14 by reason of its engagement with the support, is held firmly in place close up against the under side of the fuselage skeleton framework, suitable release mechanism being provided for this purpose.

The support 15 comprises guide rails 16 within which rollers 17 are free to rotate. These rollers 17 are carried by fittings 18 directly fastened to the fuel tank. When the fuel tank is released the rollers 17 are free to move along the rails 16 that the initial movement of the tank, during a shedding operation, may be properly controlled. The guide rails 16 are at all times held in parallelism by links 19 pivoted respectively to the fuselage and to the rails. Preferably the forward pair of links 19 is shorter than the rear pair, that the rails 16, when the support is extended, will assume an inclined position, the inclination beink directed downwardly toward the rear. Thus positioned, the fuel tank, when released, will tend to move rearwardly in the direction of such inclination.

At intervals throughout the length of the guide rails fittings 20 are provided, the fittings in each instance being spaced according to the spacing of the release mechanism later to be explained. Such release mechanism, when the fuel tank support is retracted, is adapted to grasp and hold the fittings 20 and consequently the support 15 and fuel tank 14 in place.

In Figures 3 and 4 the release mechanism is illustrated in detail. Preferably such mechanism includes a lever 21 pivoted as at 22 and a trip 23 pivoted intermediately of its ends as at 24 and at one end fastened as at 25 to a release bar 26. Where the release mechanism is duplicated at opposite sides of the fuselage and at intervals throughout the length of the fuel tank support, the release bar 26 is of a construction such that the total number of trips 23 will be operated simultaneously. In the present invention such duplication of the release mechanism is provided. To actuate the release bars 26 an operating lever 27 is provided. Such lever is preferably conveniently located in proximity to the pilot's seat. It is pivoted at one end as indicated at 28 and provided with a cross arm 29. To the forward end of the cross arm 29 a wire cable 30 is fastened, said cable being passed over guide pulleys 31 and carried to the separate release bars on the opposite sides of the fuselage. In addition to providing a means for simultaneously actuating both release bars 26, the cable 30 by reason of its rearward extension as indicated at 32, provides also an operating means for a knife 33 which is adapted to cut the fuel feed lines 34 leading from the tank 14 to the motor (not shown). In operation, the knife 33 is operated slightly in advance of the release mechanism that the fuel feed lines may be cut before the fuel tank is fully released. As the release bars 26 are moved forwardly through the operation of the lever 27, obviously the total number of trips 23 are simultaneously moved about their respective pivots 24 to simultaneously release the total number of levers 21, and since the levers 21 by reason of their engagement with the fittings 20 hold the support 15 in its retracted position obviously; the moment the levers 21 are released, the weight of the fuel tank will cause the support 15 to drop from the position indicated by the full lines in Figure 2 to the position indicated by the dotted lines in said figure, in which latter position, the fuel tank 14 is free to move bodily rearwardly toward the lower end of the inclined rails 16. To hold the support 15 in place subsequent to its release, a stop wire 35 is provided. Preferably the release mechanism, in each instance, is made as an integral part of such ordinary fuselage fittings as are usually provided at the point of intersection of the fuselage struts 12. If desired, abutments 36 may be provided at opposite sides of the fuel tank to bear against the longerons 11 of the fuselage when the tank 14 is held in place. These abutments 36 tend to prevent undue vibration of the fuel tank and at the same time better distribute the inertia stresses due to the weight of the tank. To insure a positive movement of the tank away from the fuselage during a release operation, a push rod 37 may be provided, said push rod at one end being fastened to the cross arm 29 of the operating lever and at its opposite end movable into engagement with the top surface of the tank.

Referring next to the modifications illustrated in Figures 5 to 8 inclusive, it will be noted that the operating mechanism whereby the tank is released is substanitally the same as the operating mechanism above described. The fuel tank, however, instead of being made as a single tank, is made up of separate tank sections. Collectively the tank sections, when held in place, are of substantially the same size and shape as the unit tank, though when released, are adapted to be released and shed in a somewhat different manner, the forward tank section being movable initially and the rear tank section following. In said modification, no guide rails are provided. There is provided instead, for the forward tank section 40, levers 41, said levers being pivoted to the tank 40 at one end and to the rear tank section 42 at their opposite ends as indicated at 43. Each of said levers 41 adjacent to the pivots 43 is provided with an eccentric extension 44 which in the retracted position of the levers 41 are adapted to engage and overhang pin supports 45 fastened to the longerons of the fuselage. As the tank sections 40 and 42 are released, the release mechanism being preferably the same as in the preferred form of my invention, the tank section 40 first moves from the full line position indicated in Figure 5 to the dotted line position indicated in said figure, such movement continuing in the direction indicated until the eccentric extensions 44 of the levers 41 are free from engagement with the pin supports 45. When entirely free from such engagement, obviously both tanks are free to fall, the one slightly in advance of the other.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:—

1. In an aeroplane, a movable support, mechanism operable to release the support, and a fuel tank movable with and with respect to the support upon its release.

2. In an aeroplane, a combined guide and support, mechanism operable to release the combined guide and support, and a fuel tank carried by and movable with and with respect to the combined guide and support upon its release.

3. In an aeroplane, a fuselage, a support movable when released from a retracted position close up against the fuselage to an extended position therebeneath, and a fuel tank carried by and movable with the support, said fuel tank, when the support is extended, being movable relatively thereto until shed clear thereof and of the machine.

4. In an aeroplane, a fuel tank, a support for the fuel tank, said support being movable under the influence of the weight of the fuel tank from a retracted position close up against the body of the machine to an extended position therebeneath, means for holding the support in its retracted position, mechanism operable to release the support and a guide means for the fuel tank for directing its movement after the support has been released.

5. In an aeroplane, a support for a fuel tank movable from a retracted position within the body of the aeroplane to an extended position therebeneath, a fuel tank carried by and movable with and with respect to said support, and mechanism operable to release said support.

6. In an aeroplane, a support for a fuel tank movable from a retracted position within the body of the aeroplane to an extended position therebeneath, a fuel tank carried by and movable with the support from its retracted to its extended position and movable with respect to said support when the latter is fully extended, and mechanism operable to release said support.

7. In an aeroplane, a support for a fuel tank movable from a retracted position within the body of the aeroplane to an extended position therebeneath, said support including as a structural element suitable spaced guides, a fuel tank movable with the support, and when said support is in its fully extended position, movable along said guides until it (the fuel tank) is shed clear of the support and also the machine, and mechanism operable to release the support.

8. In an aeroplane, a support for a fuel tank movable from a retracted position close up against the under surface of the body of the aeroplane to an extended position therebeneath, a fuel tank movable with the support when the latter is released until it (the fuel tank) is entirely clear of the body of the machine, said fuel tank subsequent to such movement being movable relatively to the support in order that it may be shed clear thereof as well as of the machine, and mechanism operable to release the support.

9. In an aeroplane, a support for a fuel tank movable from a retracted position within the body of the aeroplane to an extended position therebeneath, means associated with the support to limit its falling movement when released, a fuel tank carried by and movable with the support and also movable with respect to said support when the latter shall have attained its lowermost position, and mechanism operable to release the support.

10. In an aeroplane, a support for a fuel tank normally carried close up against the under surface of the body of the machine, mechanism operable to release the support, means associated with said support to limit its movement when released, and a fuel tank carried by and movable with the support throughout its limited movement and with respect thereto when its limit of movement shall have been reached.

In testimony whereof I hereunto affix my signature.

JOHN P. LANGFELDER.